No. 795,312. PATENTED JULY 25, 1905.
H. SHOEMAKER.
RECEIVING APPARATUS.
APPLICATION FILED FEB. 13, 1905.
2 SHEETS—SHEET 2.
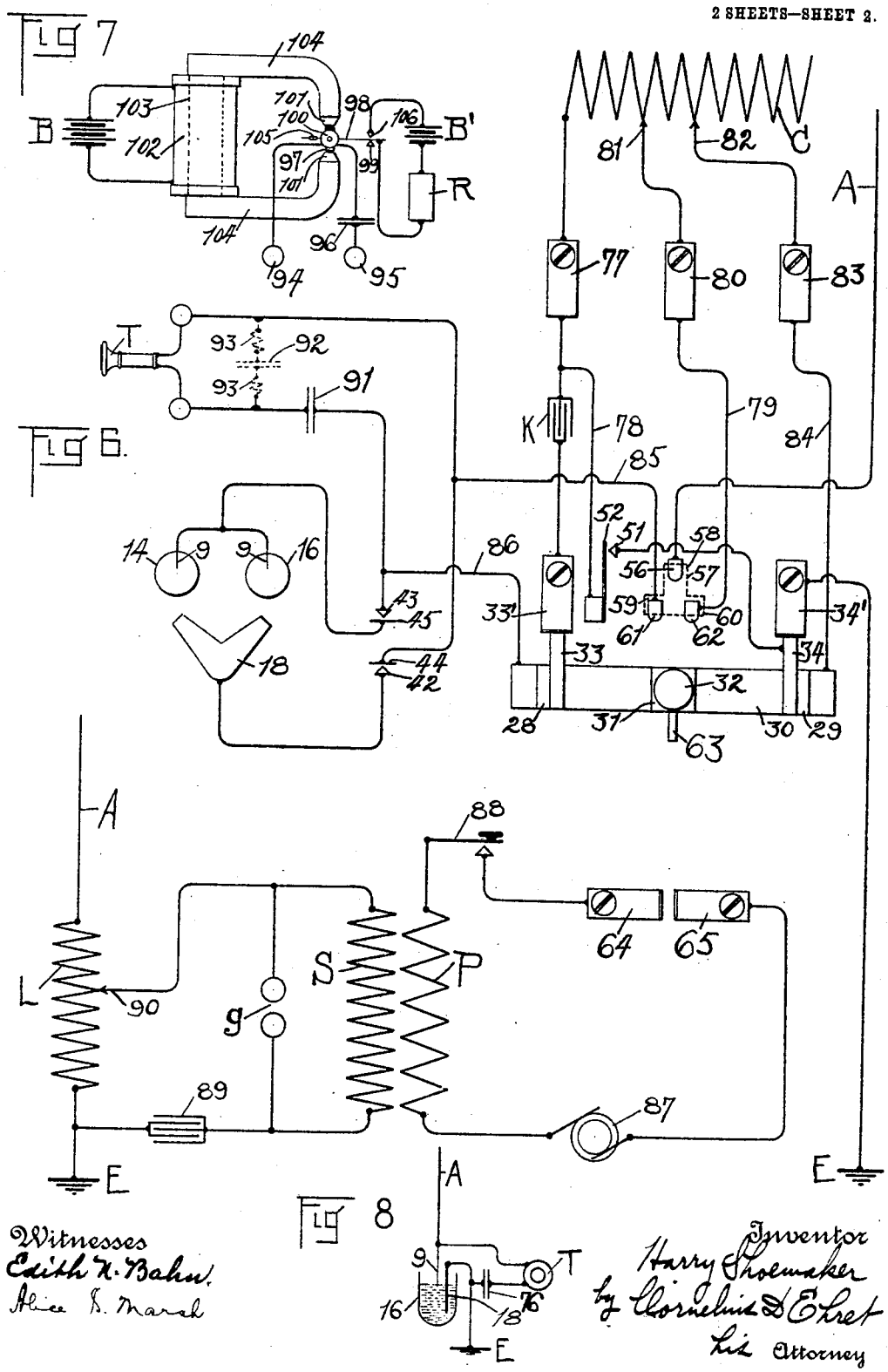

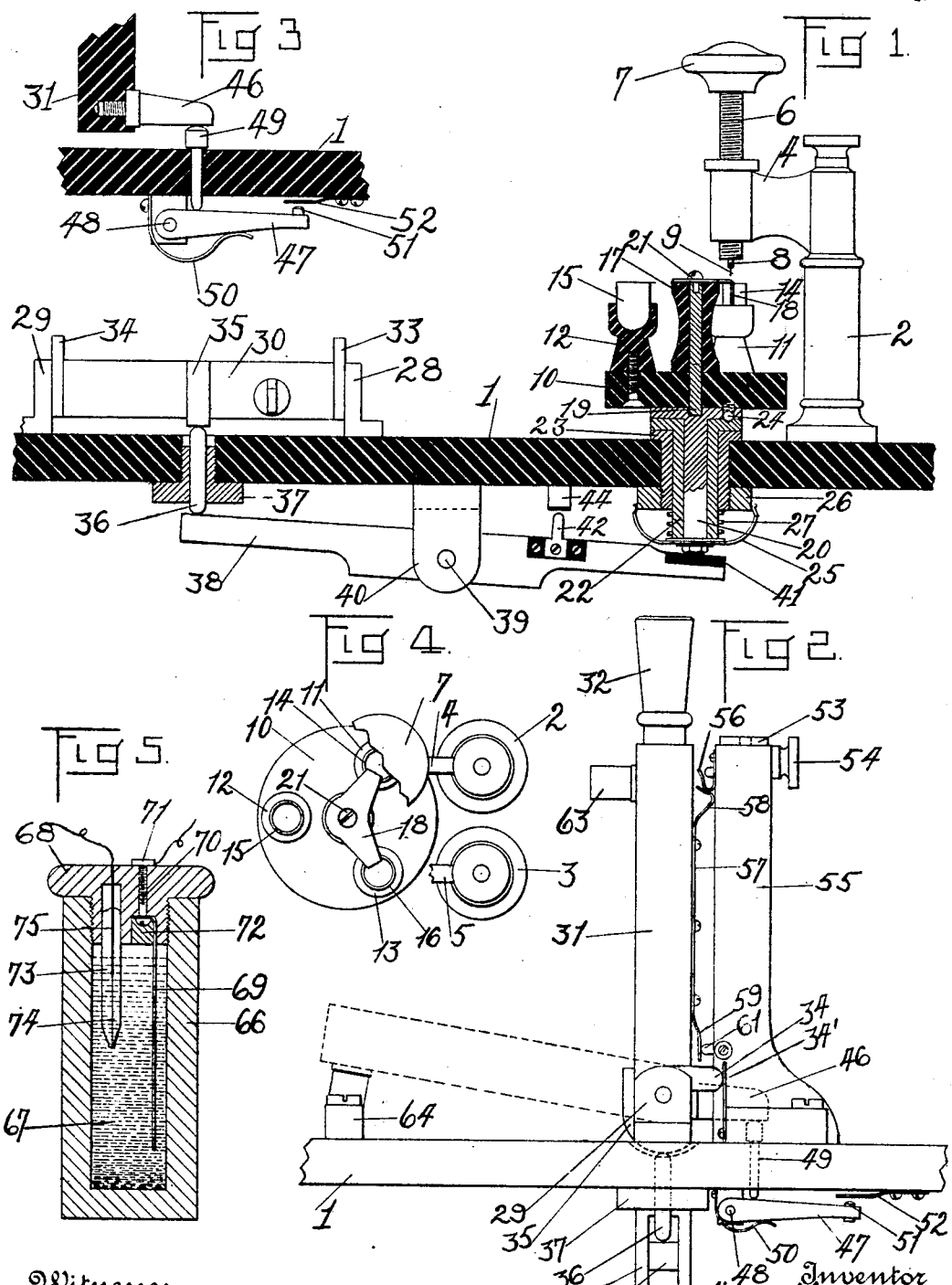

UNITED STATES PATENT OFFICE.

HARRY SHOEMAKER, OF JERSEY CITY, NEW JERSEY, ASSIGNOR TO INTERNATIONAL TELEGRAPH CONSTRUCTION COMPANY, A CORPORATION OF NEW YORK.

RECEIVING APPARATUS.

No. 795,312.   Specification of Letters Patent.   Patented July 25, 1905.

Application filed February 13, 1905. Serial No. 245,484.

*To all whom it may concern:*

Be it known that I, HARRY SHOEMAKER, a citizen of the United States, residing at Jersey City, in the county of Hudson and State of New Jersey, have invented a new and useful Receiving Apparatus, of which the following is a specification.

My invention relates to signaling apparatus, more especially the receiving apparatus as employed in signaling systems wherein electroradiant energy represents the signal or message during transmission.

More particularly, my invention resides in a detector or wave-responsive device employed in such receiving apparatus. This detector or wave-responsive device may be described as a primary cell in which one of the elements is extremely small, or rather has extremely small area of contact with the solution or excitant of the cell. Such detector is responsive to the feeblest electrical disturbances and is, in fact, much more sensitive than the detectors, consisting of a very small polarization-cell, in which the anode has very small area of contact with the electrolyte. With these polarization-cells a local source of energy is required, whereas with the primary-cell detector herein described the local source of energy, common in wireless-telegraph-receiving apparatus, is entirely dispensed with. My galvanic-cell detector is therefore clearly distinguished from electrolytic or polarization devices or other forms of detectors requiring an associated source of energy.

My invention resides also in apparatus employing such primary-cell detector and other features, as hereinafter described, and pointed out in the claims.

For an illustration of several of the numerous forms my invention may take reference is to be had to the accompanying drawings, in which—

Figure 1 is a side view, partly in elevation and partly in section, of the receiving apparatus. Fig. 2 is a vertical elevational view of a portion of the receiving apparatus and taken at right angles to Fig. 1. Fig. 3 is an enlarged view of a detail of the switching mechanism. Fig. 4 is a plan view showing the arrangement of several detectors. Fig. 5 is a vertical sectional view of one form in which the detector may be made. Fig. 6 is a diagrammatical view illustrating the mechanism and circuit arrangements of my invention. Fig. 7 is a diagrammatic view illustrating the employment of a siphon recorder or relay for producing permanent records of signals. Fig. 8 is a diagrammatic view illustrating the simplest mode of connecting the detector with the receiving-conductor.

Referring to the drawings, 1 is a suitable base or support of insulating material upon which are mounted two standards 2 and 3. Supported by each of these standards are the arms 4 and 5, respectively. Coöperating with each of the arms 4 and 5 is a screw 6, provided with a head 7 for adjusting purposes. In the lower end of the screw 6 is fastened a stud 8, carrying the extremely small cell element 9.

At 10 is shown a circular member of insulating material, upon which are mounted three standards 11, 12, and 13, supporting the glass cups 14, 15, and 16, respectively. The cup 15 is adapted to contain nitric acid or other solvent for dissolving off the silver coating at the lower tip of the cell element 9, which has a platinum-wire core of very small diameter. The cups 14 and 16 contain the primary-cell excitant, such as dilute sulfuric acid or the other excitants hereinafter referred to.

17 is a standard of insulating material mounted upon the member 10.

18 is a two-pronged member of suitable material for constituting the other element of a primary cell and, as shown, may be a plate of zinc, one prong dipping into the excitant contained in cup 14, while the other prong dips into the excitant contained in the cup 16.

Extending downwardly through the standard 17 is a metallic rod 19, screw-threaded into the cylindrical metallic member 20. The screw 21 secures the member 18 to the standard 17 and serves also to establish electrical communication between the member 18 and the rod 19. The member 20 is adapted to rotate within a sleeve 22, which in turn is adapted to move vertically within the bushing 23, extending through the base 1. Carried within an opening in the top of the member 20 is a ball 24, spring-pressed downwardly, so as to engage in any one of three symmetrically-located depressions in the top of the sleeve 22. This serves as means in the nature of a lock for determining the position of the cups when rotated with the member 20 as an axis. Secured to the member 20 is an upwardly-curved spring member 25, whose ends rub upon or engage the exterior surface of the circular nut 26, threaded to the bushing 23 and serving to fasten the same within the base member 1.

27 is a sprial spring adapted to force the member 10 and parts secured thereto in a downwardly direction to the position shown in Fig. 1. A conductor secured to the nut 26 serves as means for affording electrical communication with the member 18 by and through the intervening metallic parts, while the standards 2 and 3 serve for like purpose for affording electrical communication between another circuit-conductor and the cell elements 9.

A cell element 9—the cell-excitant contained in cup 14, for example—and the prong of the member 18, dipping into said excitant, constitute, as hereinafter described, a primary cell. Similarly the other prong of member 18, the other element 9, and the excitant contained in the cup 16 constitute a duplicate primary cell. The object of duplication is to enable the prompt cutting in of a new cell into the receiving-circuits in case of failure of the other. When it is desired to prepare an element 9 of either of the cells, the member 10 is rotated by the operator until the cup 15 comes opposite the element to be treated, whereupon the screw 6 is lowered, by means of the head 7, until the element 9 dips into the acid or solvent contained in the cup 15. When the element has been prepared, it is again elevated and the member 10 rotated until a cup containing cell-excitant and other cell-electrode are brought opposite, whereupon it is again lowered to contact with the cell-excitant, thus forming a primary cell, as previously described.

28 and 29 constitute a pair of bearing-blocks or the like for supporting and permitting the rotation of the member 30, of insulating material. Secured to the member 30 is the vertically-extending member 31, of insulating material, terminating in the handle 32. (See Fig. 2.) Upon each end of the member 30 are secured the metallic members 33 and 34, in electrical contact with members 28 and 29, respectively. As the member 30 is rotated 33 and 34 engage the spring-contacts 33' and 34', respectively, mounted upon the top of the base 1.

35 is a cam carried by the member 30 and is adapted as the member 30 is rotated to move the plunger 36 upwardly and downwardly through the bushing 37. The lower end of the plunger 36 engages upon the top side of a lever 38, pivoted at 39 in the bracket 40, supported on the under side of the base 1. At the right-hand end of the lever 38, Fig. 1, is secured a piece of insulating material 41, adapted to engage the nut on the lower end of the member 20. Thus as the member 30 or the lever 31 is rotated the lever 38 is tilted, thereby raising the member 10 in such fashion as to bring the liquids or other materials contained in the cups 14, 15, and 16 into coöperation with the elements 9. The spiral spring 27 when the contacting force is removed from the lever 38 returns the parts to position shown in Fig. 1. Secured upon and insulated from the lever 38 are a pair of contacts 42 and 43, adapted to engage the spring-contacts 44 and 45, respectively, secured upon the under side of the base 1.

Secured to the lower end of the lever 31 is a stud 46, which operates the lever 47, pivoted at 48 through the medium of the reciprocating pin 49, extending through the base 1. The operation of the lever 47 is opposed by the spring 50, which tends to keep the lever 47 in its uppermost position as viewed in Figs. 2 and 3.

51 is a contact carried by the lever 47 and coöperates with the spring-contact 52, secured on the lower side of the base 1.

53 and 54 constitute a binding-post mounted upon the upper end of the pillar 55, of insulating material, mounted upon the top of the base 1. This binding-post is adapted to receive the connection from the aerial conductor A, as hereinafter described.

56 is a spring-contact in electrical communication with the binding-post 53 54.

57 is a piece of sheet metal secured to the lever 31 and terminating in its upper end in the spring-contact 58, adapted to engage the contact 56 and to lock under the same. The sheet 57 terminates at its lower end in two prongs 59 and 60, adapted to engage the fixed contacts 61 and 62, respectively, secured to the pillar 55.

Upon the lever 31 is mounted a metallic contact 63, which is adapted to engage and bridge contacts 64 and 65, respectively, mounted upon the top of the base 1, thus constituting a switch controlling the circuit of the transmitting apparatus, as hereinafter described.

Referring to Fig. 5, 66 represents a receptacle of hard rubber or other suitable insulating material containing cell-excitant liquid or substance 67. 68 is a screw-threaded cap engaging the receptacle 66 and having mounted upon its under or inner side the cell element 69, of zinc, iron, or other suitable material, held by the screw 70, which terminates at its outer end in the cell terminal 71. 72 is shellac, sealing-wax, or other suitable material for protecting the screw 70 from the cell-excitant. Also carried by the cap 68 is the glass tube 73, whose lower end is sealed around a very fine platinum wire 74, the wire and end of the glass tube being ground off flush. 75 is a conductor secured to the fine platinum wire 74 and extending through the cap for purposes of circuit connection. The primary cell consists, therefore, of two cell elements of different materials immersed in or contacting with a suitable cell-excitant, one at least of the elements having extremely small area of contact with the excitant. Any gas that may be evolved is permitted to escape by any suitable opening through either the receptacle 66 or the cap 68, such opening consisting, preferably, of a hole of very small diameter.

The detector may be made in the form of a dry cell, none the less primary cell, by filling the interior of the receptacles, as 14, 16, or 66 with a material—such as gelatin, cellulose, or the like—serving as a carrier or retainer for the excitant proper, thus permitting the detector to be placed in any position whatsoever without interfering with its action. In fact, in the case where the detector is not in the nature of a dry cell, the excitant being a body of liquid, the detector may be placed in any position for a considerable period of time. With the detector in the dry-cell form or in the form last mentioned it can be mounted directly upon a telephone-receiver, thus making an extremely compact and extremely sensitive receiver or detector.

The primary-cell detector may have as its elements any suitable materials, though those most preferred are those distant from each other in the electromotive-force series. For example, the larger cell element may be zinc, while the extremely small cell element may be platinum, tantalum, or carbon. Platinum, as is well known, can be drawn out into extremely-fine wires to serve for such purpose, and so may tantalum, which is highly resistant to chemical action by acids, and carbon is obtainable in filament form having a diameter in the neighborhood of one one-thousandth of an inch or less. With these substances a ten-per-cent. solution of sulfuric acid is the preferable cell-excitant. Iron or other substances may of course be substituted for the zinc.

With the platinum, tantalum, carbon, or other small cell element may be used a solution of potassium hydroxid, the larger cell element being in such case preferably aluminium.

Tantalum is desirable as a cell element because of its great heat-resisting power—that is, since it resists fusion or burning even better than platinum. I have found that the small platinum cell element is sometimes destroyed, as hereinafter pointed out, by fusion or burning out. To prevent this, tantalum or carbon may be substituted for the platinum.

A simple mode of connecting my primary-cell detector in circuit with the receiving-conductor is illustrated in Fig. 8, wherein A represents the usual aerial receiving-conductor. 16 is the receptacle containing the cell-excitant, 18 being one cell element, while 9 is the platinum or other element having extremely small area of contact with the excitant. The element 9 is shown as connected to the aerial conductor, while the element 18 is shown connected to the earth-plate E. T is a magneto-telephone receiver connected through the condenser 76 with the terminals of the primary cell. The presence of the condenser 76 is not essential, the device being operative when the telephone-receiver T is connected directly to the terminals of the primary cell. The condenser 76 prevents any normal constant flow of current from the primary cell through the winding of the telephone-receiver T. Upon the reception of electroradiant energy, however, signals are sharply and clearly produced in the telephone-receiver T, both when the condenser 76 is present and when absent. I have found also that it is immaterial which element of the primary-cell detector is connected to the aerial conductor.

Referring to Fig. 6, showing a more elaborate system of connections, A represents the aerial conductor used for both transmitting and receiving. C represents a tuning-coil consisting of a plurality of convolutions of conductor wound upon a suitable bobbin or frame. One end of the tuning-coil is connected to binding-post 77, from which connection is made by conductor 78 with the contact 52, heretofore described. K is a condenser intervening between the binding-post 77 and the contact 33'. The conductor 79 joins the contact 62 with the binding-post 80, from which extends a flexible conductor terminating in the movable contact 81, whereby more or less of the tuning-coil C may be included in circuit. 82 is a second movable contact for engaging different points in the tuning-coil C and is connected with binding-post 83, which is joined by conductor 84 with the member 29. 85 is a conductor joining the contact 61 with the contact 44, and the conductor 86 joins the contact 43 with the member 28. 87 is an alternating-current generator or other suitable source of current which is joined in series with the contacts 64 and 65, operator's key 88, and the primary P of a transformer whose secondary S is bridged by the spark-gap $g$. 89 is a condenser, and 90 is a movable contact for adjusting the amount of the inductance L, which is connected between the aerial radiating conductor A and the earth connection E.

The operation is as follows: When messages are being transmitted, the lever 31 is in its approximately horizontal position, as shown by dotted lines in Fig. 2. When in such position, the contact 63 bridges the contacts 64 and 65, thereby closing the primary circuit of the transmitting-transformer and permitting the transmission of messages by the operator's key 88 in the well-known manner. When it is desired to receive messages, the lever 31 is rotated in a clockwise direction, as viewed in Fig. 2, thus interrupting the circuit of the primary of the transmitting-transformer, so that high-power oscillations may not be accidentally generated during the reception of signals, with resultant confusion and danger to the receiving apparatus. Before the lever 31 has reached its final operative position the contacts 51 and 52 are in engagement. At the instant of contact between 56 and 58 there is a path from the aerial conductor A through the sheet-metal member 57, thence through contacts 60 and 62, conductor 79, contact 81, contact 82, conductor 84 to member 29, through contacts 34 and 34' to earth-plate E, and also through conductor 79, contact 81, conductor 78, contacts 51 and 52 to contacts 34 and 34', and thence to earth-plate E. The result is that the aerial conductor is completely discharged of any residual charge that may have remained from the high potentials used in transmitting. I have found that it is this residual charge that frequently destroys the wave-responsive device of whatever type that may be used in the receiving-circuits, and especially of the types employing extremely fine conductors—as, for example, in the detectors herein shown. As the rotation of the lever 31 is continued the contact 58 locks under the contact 56, retaining the parts in the position shown in Fig. 2. In arriving at this final position the stud 46 is depressed, the pin 49 thus separating the contacts 51 and 52. Immediately after the aerial conductor has been relieved of residual charge and after contacts 51 and 52 have separated the contact 42 engages contact 44 and contact 43 engages contact 45, thus throwing into circuit one or the other, or both, of the detectors carried upon the member 10. The member 10 is elevated, and the contacts 42 44 and 43 45 are brought into engagement by the tilting of the lever 38, caused by the cam 35 depressing the plunger 36. With the parts in this final position the detector, consisting of a point 9 and a prong of the zinc element 18, is connected in shunt to a portion of the tuning-coil C, the condenser K intervening to prevent a short-circuiting of the detector through such tuning-coil C. The telephone-receiver T is connected through the condenser 91 with the terminals of the detector. It is to be understood, however, that the condenser 91 may be omitted, thus placing the telephone-receiver T directly in shunt with the detector, or the condenser 92 and choke-coils 93 (shown in dotted lines in Fig. 6) may be connected in shunt with the magneto telephone-receiver T either when the condenser 91 is present or when it is absent. Furthermore, the telephone-receiver T and condenser 91 may be omitted and the condenser 92 employed as a condenser telephone-receiver to reproduce the signals. The choke-coils 93 are employed to prevent the condenser 92 from permitting the passage of the received oscillations through a path other than that through the detector. When oscillations are received upon the aerial conductor A, they are caused to impinge upon the detector. There then result clicks in the receiver T or the condenser telephone-receiver. In connection with Fig. 8 it is to be understood, of course, that the telephone-receiver T may be omitted and the condenser 76 employed as a condenser telephone-receiver, provided, however, choke-coils are provided, as in the case of condenser 92.

The telephone-receivers heretofore described, both the magneto and the electrostatic or condenser, serve to produce audible signals. When it is desired, however, to produce a permanent record, the apparatus shown in Fig. 7 may be employed. To this end the binding-posts 94 and 95 may be connected with the contacts 43 and 44, the telephone-receiver T and condenser 91 and condenser 92 being omitted. Through the condenser 96 a circuit is then made through the movable coil 97, consisting of a plurality of convolutions of conductor, as in the case of the well-known siphon-recorder or the Deprez D'Arsonval galvanometer. The coil 97 is preferably delicately pivoted on jewels, the current being led into and out of the coil by means of flat spiral springs which serve also to give the tongue 98 a bias toward the position against the back-stop 99. Supported within the moving coil 97 is the iron or steel core 100. The coil is thus adapted to oscillate or move upon its pivots within the extremely narrow air-gap between the core 100 and the poles 101, which are conical or tapered in form to create a most intense magnetic field in the region occupied by the coil 97. This magnetic field is produced by the winding 102, traversed by current derived from a source B of direct-current energy. The winding 102 is disposed upon the core 103, from which extend the magnetizable members 104, terminating in the poles 101. The magnetic circuit of the device is saturated both for the purpose of producing an intense field in the air-gap and for rendering the device non-sensitive to fluctuations in the current supplied by the source B. The moving system comprising the coil 97 and the tongue 98 is carefully balanced, a movable counterweight 105 being provided for this purpose. The tongue 98 controls a local circuit including the source B of electrical energy and the recorder R, which may be the ordinary Morse recorder. When oscillations are received upon the aerial conductor A, the coil 97 will rotate in its field and bring the tongue 98 into engagement with contact 106, thus closing the local circuit and producing a record.

In place of controlling a local circuit the tongue 98 may carry a marker, such as in a siphon-recorder, to mark directly upon a ribbon of moving paper. In this type of apparatus the insertion of the condenser 96 in the circuit of the coil 97 is of peculiar advantage in that normally there is no current-flow through the coil 97, because the condenser 96 prevents the flow of a direct current. This means that the normal position of the tongue 98 is definitely determined as distinguished from the case where normally a current flows through the moving coil and is likely to fluctuate from time to time, thus throwing the apparatus out of adjustment. When the condenser 96 is employed no current flows except when signals are being received, with the result that none but true signals-records will be produced either by the siphon-recorder or by the recorder R.

What I claim is—

1. In a wireless signaling system, receiving apparatus comprising a receiving-conductor, a source of electrical energy comprising an electrochemical cell associated therewith as a wave-responsive device, and a local circuit connected in shunt to said wave-responsive device and including a signal-translating instrument.

2. In a wireless signaling system, receiving apparatus comprising a receiving-conductor, a primary cell associated therewith as a wave-responsive device, and a local circuit connected in shunt to said wave-responsive device and including a signal-translating instrument.

3. In a wireless signaling system, a receiving-conductor, a primary cell associated therewith as a wave-responsive device, an element of said cell having a small area of contact with the excitant, and a local circuit connected in shunt to said cell and including a signal-translating instrument.

4. In a wireless signaling system, receiving apparatus comprising a receiving-conductor, a primary cell associated therewith as a wave-responsive device, an element of said cell having small area of contact with the excitant, said area of contact being constant in extent, and a local circuit connected in shunt to said cell and including a signal-translating instrument.

5. In a wireless signaling system, receiving apparatus comprising a receiving-conductor, a primary cell associated therewith as a wave-responsive device, an element of said cell being chemically inert with respect to the excitant and whose area of contact with the excitant is small, and a local circuit connected in shunt to said cell and including a signal-translating instrument.

6. In a wireless signaling system, receiving apparatus comprising a receiving-conductor, a primary cell associated therewith as a wave-responsive device, an element of said cell being chemically inert with respect to the excitant and whose area of contact with said excitant is small and constant in extent, and a local circuit connected in shunt to said cell and including a signal-translating instrument.

7. In a wireless signaling system, receiving apparatus comprising a receiving-conductor, a primary cell associated therewith as a wave-responsive device, an element of said cell consisting of platinum and having small area of contact with the excitant, and a local circuit connected in shunt to said cell and including a signal-translating instrument.

8. In a wireless signaling system, receiving apparatus comprising a receiving-conductor, a primary cell associated with said conductor as a wave-responsive device, and a local circuit connected in shunt to said cell and including a signal-translating instrument, the elements of said cell being zinc and platinum respectively, the platinum element having small area of contact with the excitant.

9. In a wireless signaling system, receiving apparatus comprising a receiving-conductor, a primary cell associated therewith as a wave-responsive device, and a local circuit connected in shunt to said cell and including a signal-translating instrument, the elements of said cell being zinc and platinum respectively and the excitant being composed in part of sulfuric acid, said platinum element having small area of contact with said excitant.

10. In a wireless signaling system, receiving apparatus comprising a receiving-conductor, a source of electrical energy comprising an electrochemical cell associated therewith as a wave-responsive device, and a local circuit connected in shunt to said wave-responsive device and including a condenser and a signal-translating instrument serially connected.

11. In a wireless signaling system, receiving apparatus comprising a receiving-conductor, a primary cell associated therewith as a wave-responsive device, and a local circuit connected in shunt to said cell and including a condenser and a signal-translating instrument serially connected.

12. In a wireless signaling system, receiving apparatus comprising a receiving-conductor, a primary cell associated therewith as a wave-responsive device, and a local circuit connected in shunt to said cell and including a signal-translating instrument, an element of said cell consisting of a conductor inclosed in an insulating-casing, said casing and conductor being ground off whereby only the end surface of the conductor contacts the cell-excitant.

13. In a wireless signaling system, receiving apparatus comprising a receiving-conductor, a primary cell associated therewith as a wave-responsive device, and a local circuit connected in shunt to said cell and including a signal-translating instrument, an element of said cell consisting of a conductor sealed in an insulating-casing, said casing and conductor being ground off, whereby only the end surface of the conductor contacts the cell-excitant.

14. In a wireless signaling system, receiving apparatus comprising a receiving-conductor, a primary cell associated therewith as a wave-responsive device, and a local circuit connected in shunt to said cell and including a signal-translating instrument, an element of said cell consisting of a small platinum wire sealed in glass, said wire and glass being ground off, whereby only the end surface of the wire contacts the cell-excitant.

15. In a wireless signaling system, receiving apparatus comprising a receiving-circuit, a source of electric energy comprising an electrochemical cell associated with said circuit as a wave-responsive device, a local circuit, and a signal-translating instrument included therein, said wave-responsive device being common to said receiving-circuit and to said local circuit.

16. In a wireless signaling system, an aerial conductor, means for discharging said conductor and thereafter associating a wave-responsive device therewith.

17. In a wireless signaling system, an aerial conductor, and means for successively discharging said conductor and bringing a wave-responsive device into association therewith.

18. In a wireless signaling system, an aerial conductor, means for connecting said conductor directly to earth, and means for thereafter associating a wave-responsive device with said conductor.

19. In a wireless signaling system, an aerial conductor, means for temporarily connecting said conductor directly to earth, and means for thereafter associating a wave-responsive device with said conductor.

20. In a wireless signaling system, receiving apparatus comprising a receiving-circuit, a primary cell associated therewith as a wave-responsive device, a local circuit, and a signal-translating instrument included therein, said cell being common to said receiving and local circuits.

21. In a wireless signaling system, receiving apparatus comprising a receiving-circuit, a source of electrical energy comprising an electrochemical cell associated therewith as a wave-responsive device, a local circuit, and a telephone-receiver included therein, said cell being common to said receiving and local circuits.

22. In a wireless signaling system, receiving apparatus comprising a receiving-conductor, a primary cell associated therewith as a wave-responsive device, and a local circuit connected in shunt to said cell and including a telephone-receiver.

23. In a wireless signaling system, receiving apparatus comprising a receiving-conductor, a source of electrical energy comprising an electrochemical cell associated therewith as a wave-responsive device, and a local circuit connected in shunt to said wave-responsive device and including a siphon-recorder.

24. In a wireless signaling system, receiving apparatus comprising a receiving-conductor, a primary cell associated therewith as a wave-responsive device, and a local circuit connected in shunt to said cell and including a siphon-recorder.

25. In a wireless signaling system, receiving apparatus comprising a receiving-conductor, a primary cell associated therewith as a wave-responsive device, and a local circuit connected in shunt to said cell and including a condenser and a siphon-recorder serially connected.

26. In a wireless signaling system, receiving apparatus comprising an aerial conductor, a circuit associated therewith in conductive relation, a wave-responsive device comprising a primary cell included in said circuit, a local circuit, and a signal-translating instrument included therein, said primary cell being common to both said circuits.

27. In a wireless signaling system, receiving apparatus comprising an aerial conductor, an inductance connected between said aerial conductor and earth, a circuit associated with said aerial conductor in conductive relation, a wave-responsive device comprising a primary cell included in said circuit, a local circuit including said primary cell, and a signal-translating instrument included in said local circuit.

HARRY SHOEMAKER.

Witnesses:
JAMES M. SAWYER,
FREDK. W. MIDGLEY.